United States Patent [19]

Jacob

[11] Patent Number: 4,978,235
[45] Date of Patent: Dec. 18, 1990

[54] JOINT BEARING

[76] Inventor: Werner Jacob, Briandring 29, 6000 Frankfurt/Main 70, Fed. Rep. of Germany

[21] Appl. No.: 479,344

[22] Filed: Feb. 13, 1990

[30] Foreign Application Priority Data

Feb. 15, 1989 [DE] Fed. Rep. of Germany ....... 3904456

[51] Int. Cl.$^5$ .............................................. F16C 33/36
[52] U.S. Cl. ..................................... 384/450; 384/565; 384/569
[58] Field of Search ................. 384/450, 565, 569, 95, 384/558, 495

[56] References Cited

U.S. PATENT DOCUMENTS

| 3,990,753 | 11/1976 | Kellstrom et al. | 384/450 |
| 4,215,906 | 8/1980 | Speicher | 384/450 |
| 4,227,754 | 10/1980 | Kellström | 384/450 |
| 4,828,404 | 5/1989 | Takata | 384/569 |

Primary Examiner—Lenard A. Footland
Attorney, Agent, or Firm—Toren, McGeady & Associates

[57] ABSTRACT

A joint bearing in which a rolling member has been designed in such a way that relative to the inner race track and outer race track representing a circular arch, four contact points are obtained, the rolling member is associated with a central cylindrical portion and carrying portions which adjoin it at both ends, and has an outer contour with a radius which is osculated relative to the inner race track and the outer race track, so that a relatively small and compact joint bearing is formed which permits both an angular movement and a rotational movement while reducing friction. The four-point contact permits accurate guidance of the rolling members and eliminates the need for guiding edges.

6 Claims, 3 Drawing Sheets

JOINT BEARING

BACKGROUND OF THE INVENTION

The invention relates to a joint bearing in which the inner race and outer race may be articulated relative to each other and where additionally, rolling members, which may be guided by a cage, are rollingly arranged at the inner race track and outer race track on a circular track. The cross-section of the inner race track and the outer race track being designed to have the shape of a circular arch and the center of the outer race track being arranged on the axis of rotation of the bearing.

There are prior art joint bearings in which the rolling members are designed as drums. Their cylindrical line is adapted to the track profile of the outer and inner race, with the osculation center of the rollers being positioned exactly in the center of the track profile. Even slight axial thrusts cause the two centers to become offset, which offset is always contained in the range of self-inhibition. The rollers require very accurate axis-parallel guidance.

To counteract this effect, such drum-shaped rollers are guided at the inner race between firm guiding edges and are spaced by a cage. A further disadvantage is that for the purpose of ensuring sufficiently accurate axis-parallel guidance at the edges, only drums with a diameter-to-length ratio of <1:1.5 may be used. Furthermore, it is essential for the drum center to be at an accurate distance from the guiding edges, otherwise the drum center will be displaced from its track center, which in turn will result in a reduction in speed (unilateral contact) and in an increase in friction.

Such requirements make bearings with drum-shaped rollers uneconomical and in addition, their application becomes very critical.

SUMMARY OF THE INVENTION

Accordingly, it is an object of the present invention to provide a joint bearing which is relatively small and inexpensive to produce and which, in spite of coarser tolerances, prevents jamming of the rolling members.

Pursuant to this object, and others which will become apparent hereafter, one aspect of the present invention resides in the rolling members having a central cylindrical portion and carrying portions which adjoin the central cylindrical portion on either side, which are rotation-symmetrical with reference to the rolling member axis and which are supported at the outer race track and at the inner race track while forming four contact points. Additionally, the contact points, with reference to the central plane containing the centers of the inner race track and the outer race track are arranged to be offset at an angle which is greater than the self-inhibition angle.

This design achieves a defined contact between the rolling members and the associated inner race and outer race in four points. These four contact points are positioned outside the region of self-inhibition, as a result of which jamming of the rolling members is avoided. Furthermore, the cylindrical portion ensures that in the central region there cannot be any contact under any circumstances. The four point contact design also eliminates the need for guiding the rolling members on edges at the inner race, for example, so that there is no need for accurate machining of the end faces of the rolling members and finally, the edges may be eliminated. The four point contact ensures accurate guidance of the rolling members during the rolling process, which guidance may be assisted by the cage, but this is not essential.

Furthermore, it is possible to achieve bearing conditions where diameter-to-length ratios in excess of 1:2 may be realized. The greater the bearing ratio, the more advantageous the guiding conditions with the joint bearing in accordance with the invention because the guiding length increases. As with the help of modern production methods the outer contour of the rolling members can be produced across the entire length simultaneously, it is also possible, in a simple way, to monitor the size of the individual rolling members. This procedure is simplified in that the central portion has a cylindrical design. However, subsequent measurements and classification of the drum-shaped rollers is complicated. Measuring the rolling member diameters for classification purposes in the region of the contact points would be practically impossible. The rollers have the shape of full rollers, with the cage being eliminated, or a cage with a small number of rollers may be used.

With reference to a further embodiment, the carrying portions have an outer contour corresponding to a circular arch, with the radius being smaller than the radius of the outer race track or inner race track. The center is arranged on an imaginary ray starting from the center of the outer race track and inclined by the angle of inclination of the contact points relative to the central plane.

Because of the osculation feature, this design ensures that the contact points are always positioned outside the region of self-inhibition. With standard material pairing, the self-inhibition angle reaches values up to approximately 7°. In other words, the position of the contact points should be selected to be such that, with reference to the central plane, they are arranged at an angle which is greater than the above angle.

To be on the safe side, it is proposed by the invention that the angle by which the contact points are offset relative to the central plane should exceed the self-inhibition angle by at least the maximum tilting angle.

In this way, even if the bearing is in a tilted position, i.e., if the inner race is articulated relative to the outer race, it is impossible for individual rolling members to approach the area of self-inhibition.

If, for example, starting from the normal position where the axes of the inner race and outer race coincide, there occurs an angle toward one side of 2°, the invention specifies that the angle of offset of the contact points must be at least 9° (7° plus 2°).

Particularly advantageous carrying conditions are obtained if the radius of the outer contour of the carrying portions of the rolling members has been dimensioned relative to the radius of the outer race track or inner race track with an osculation factor in accordance with equation $$S = \frac{R_L}{2 \times R_W}$$

with S having a value between 0.51 and 0.75.

It has also been proposed that the angle by which the contact points are inclined and offset relative to the central plane should amount to at least 7° plus the maximum tilting angle starting from the central position.

According to a further essential feature of the invention, the outer contour of the rolling members, including the central portion, is ground to its finish dimensions by using profiled forming discs. The profiled discs have been provided with the final contour. Because of the cylindrical portion it is also possible to measure the diameters existing in the region of the contact points, and in consequence, it is possible to classify the individual rolling members and associate them with the correct inner and outer race.

Overall, the four contact point design permits the diameter of the individual rolling members to be reduced because the end faces are no longer required for guiding the rolling members at the inner ring edges. The end faces may be smaller and they may even remain unmachined. Reducing the diameters of the individual rolling members as compared to prior art drum-shaped rollers also leads to a more compact design and thus to a greater range of application. It is now possible to use joint bearings with rolling members even in areas which so far have been reserved for friction bearings. At the same time, the disadvantage of friction bearings regarding the high friction upon rotation of the parts to be connected may be eliminated. In other words, the range of application may be extended.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
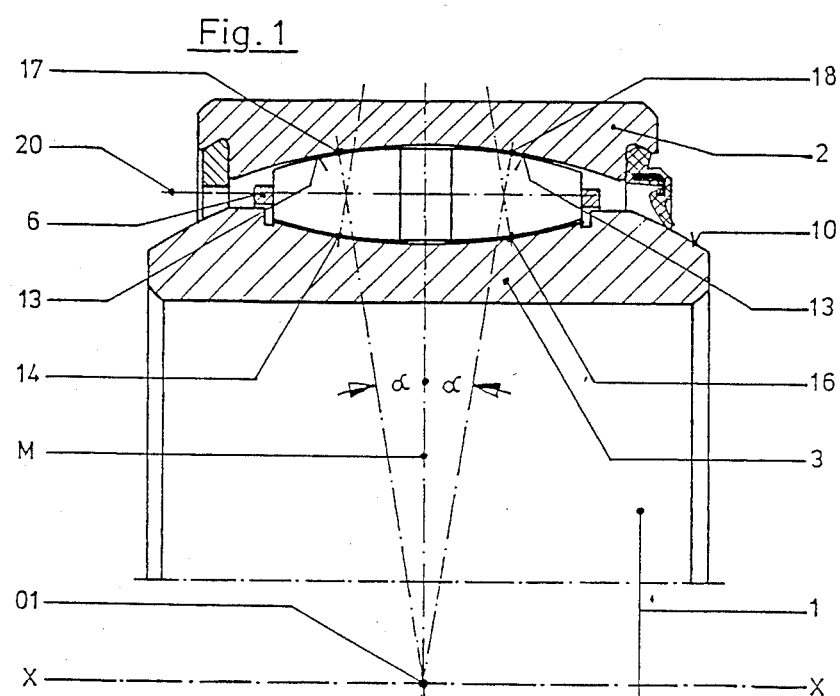
FIG. 1 is a longitudinal partial section through a joint bearing with a bearing axis of rotation X—X, in an extended position.

The joint bearing 1 as illustrated in the above figures comprises an inner race 2, an outer race 3 arranged concentrically thereto, and rolling members 5 rollingly arranged between the two. The rolling members 5 are rollingly arranged on a circular track with a pitch circle 20 around the axis of rotation X—X. They are supported on the innner race track 7 and the outer race track 8. The rolling members 5 are arranged so as to be circumferentially distributed and held by a cage 6.

Figure 4:
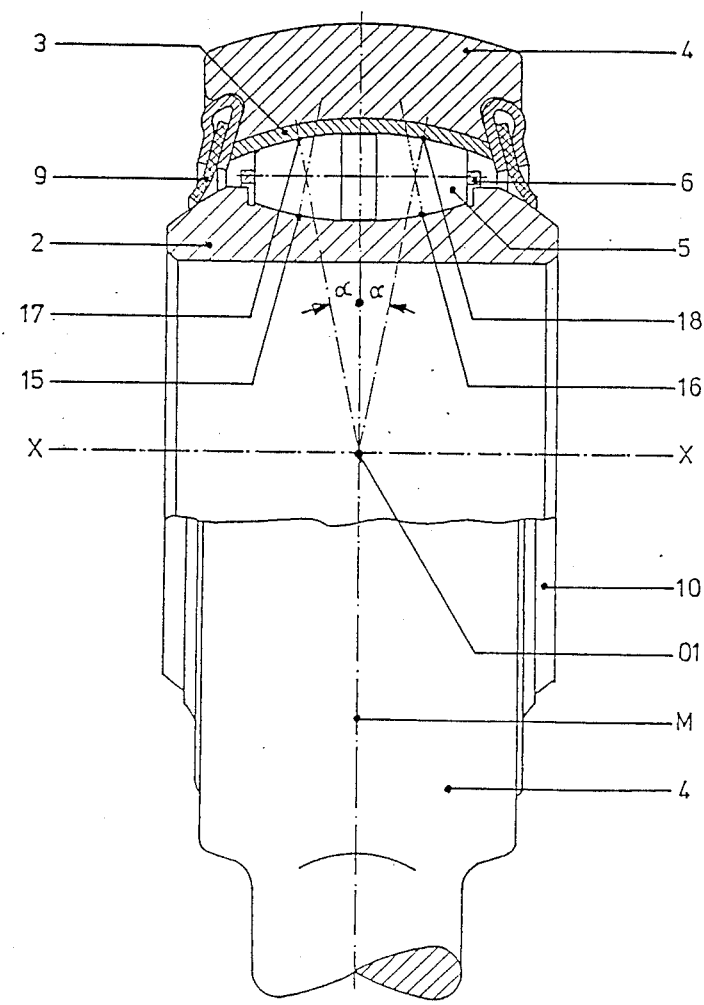
FIG. 4 is a longitudinal section through an embodiment in the form of a joint head with an alternative outer race design.

It can be seen that the rolling members 5 have been provided with a central cylindrical portion 11 and carrying portions 12 laterally adjoining the latter. The two carrying portions 12 have been designed in such a way that under load, four contact points 15, 16, 17, 18 are obtained relative to the inner race track 7 and the other race track 8. The contact points 15–18 have been arranged in such a way that outside the region of self-inhibition they ensure contact of the rolling members with the inner race track 7 and the outer race track 8. For this purpose, the contact points 15–18, with reference to the central plane M obtained as a central plane when inner race 2 and outer race 3 are in an extended, i.e., aligned position (as shown in FIGS. 1 and 4), are arranged at an inclination angle $\alpha$ which is greater than the self-inhibition angle. Furthermore, the angle $\alpha$ is dimensioned in such a way that even across the entire range of articulation of the inner race 2 and outer race 3 relative to each other even individual rolling members cannot reach the region of self-inhibition.

The design of the inner race track 7, the outer race track 8 as well as the outer contour of the rolling members 5 are explained in more detail in connection with FIG. 3.

Figure 2:
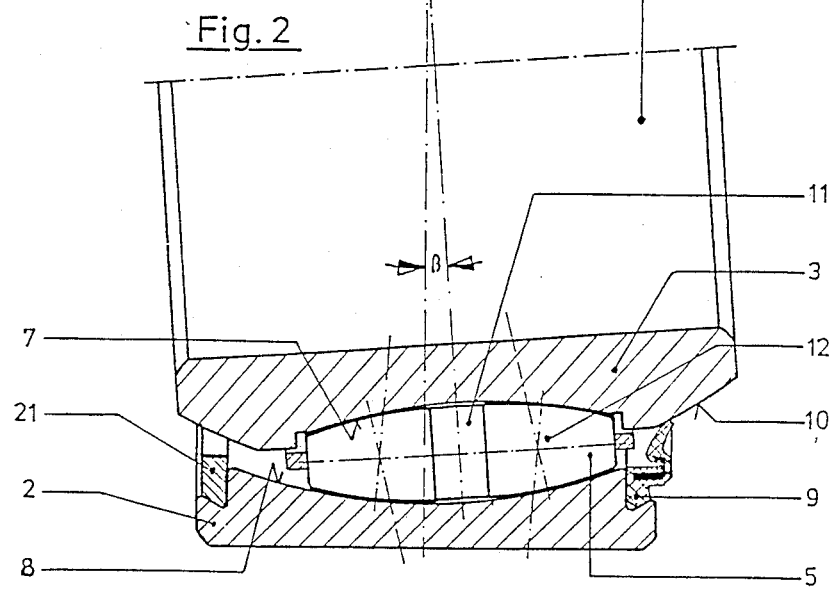
FIG. 2 shows the joint bearing according to FIG. 1 with the inner race in a tilted position.

From FIGS. 1, 2 (right-hand half) and 4 it can also be seen that there has been provided a seal 9 for sealing the free space between the outer race 3 and the inner race 2. This seal 9 rests with a sealing lip on a seal contact face 10 of the inner race 2 which is designed as a radius around the center $0_1$. If the joint bearing is supplied without a seal, it is provided with an expendable lock 21 limiting the articulation of the inner race 2 relative to the outer race 3.

The embodiments according to FIG. 4 has essentially the same parts with the exception of the outer race 3 which has a different design. The outer race 3 is designed as a formed plate metal part received in an outer race carrier or joint head 4. With this design, only the outer race 3 in the form of a plate metal strip has to have the material properties required to achieve the bearing properties, whereas the joint head 4, for example, may be made of aluminum or the like.

Figure 3:
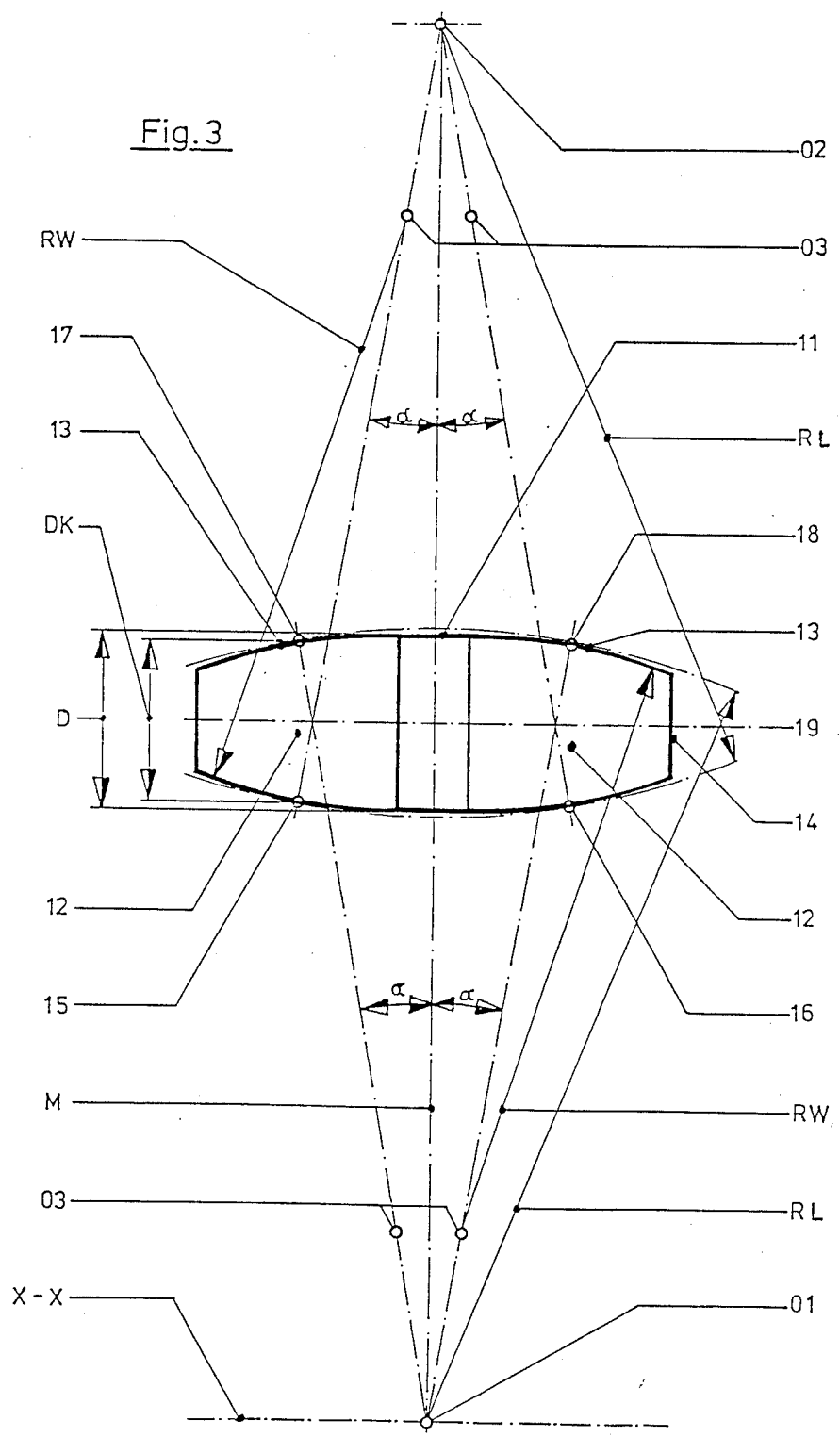
FIG. 3 shows the details regarding design and mutual association of the inner race track, the outer race track and the rolling members in an enlarged scale.

From FIG. 3 it can be seen that contact is established in four contact points 15, 16, 17, 18. The rolling member 5 comprises a central cylindrical portion 11 having a diameter D. On either side of the cylindrical portion 11 the rolling member 5 changes into carrying portions 12 which have a specially designed outer contour 13 via which contact at the four contact points 15–18 is achieved.

The contact points 15–18 are preferably obtained by providing the outer contours 13 of the carrying portions 12 with an osculation of the radius $R_W$ of the rolling member 5 relative to the radius $R_L$ of the inner race track 7 and outer race track 8. First, with a predetermined value for the radii $R_L$ of the inner race track 7 and outer race track 8, their centers $O_1$ and $O_2$ have to be determined on the central plane M in the case of the outer race 3 and the inner race 2.

Starting from the central plane M and the centers $O_1$ and $O_2$, the contact points 15, 16 starting from center $O_2$ and contact points 17, 18 for the outer race track 8 starting from center $O_1$, have to be arranged so as to be inclined and offset by the angle $\alpha$, with the angle of offset $\alpha$ being greater than the self-inhibition angle and amounting to approximately 7°. It also has to be taken into account that in accordance with the extent of the possible articulation of the outer race 3 relative to the inner race 2, the angle $\alpha$ has to be increased by the corresponding tilting angle $\beta$, for example 2°. For the contact points 15–18 determined in the point of intersection with the inner race track 7 and outer race track 8, the size of the radius for the outer contour 13 of the two carrying portions has to be determined, taking into account the osculation conditions to be selected which influence the load bearing capacity of the bearing. As a rule, an osculation value of 0.51 to 0.75 is used. This means that the radius $R_W$ of the outer contours 13 has to be approximately 2% smaller than the radius $R_1$ given for the inner race track 7 and the outer race track 8. The center $O_3$ of the two outer contours 13 has to be arranged with a corresponding offset starting from the center $O_1$, on a ray starting from the center $O_1$ and extending through the contact points 17 and 18.

The end faces 14 of the two carrying portions 12 of the rolling member 5 do not have any particular significance because they do not have to have a guiding function relative to the inner race 2 and the outer race 3.

Furthermore, by machining the outer face of the rolling member 5 in the region of the outer contours 13 of the carrying portions 12 and of the central part in the form of the cylindrical portion 11 by means of a profiled grinding disc, it is possible to achieve measurability. In the case or rolling members 5 where the diameter $D_K$ of the contact points 15–18 is of great significance, this is not possible because the contact points are positioned in a region of the outer contours which is difficult to determine in advance. In other words, providing the central cylindrical portion 11 means making use of an auxiliary factor for measuring the diameter D which, on the basis of calculations, may be associated with certain positions and diameters $D_K$ of the contact points 15–18. In this way, an association with the correct graduations of the tracks of inner race 2 and other race 3 becomes also possible, so that the required conditions of play are achieved.

It can also be seen from FIG. 3 that the two carrying portions 12 represent rotational members relative to the rolling member axis 19 in the case of which the outer contour 13 rotates around this axis 19.

While the invention has been illustrated and described as embodied in a joint bearing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. A joint bearing having an inner race and an outer race which may be articulated relative to each other, and rolling members guided by a cage and rollingly arranged at the inner race track and outer race track on a circular track, the inner race track and the outer race track having a cross-section with a circular arch shape, the outer race track having a center arranged on the axis of rotation of the bearing, the rolling members (5) comprising a central cylindrical portion (11), and carrying portions (12) which adjoin the central cylindrical portion (11) on either side, the central cylindrical portion (11) and the carrying portions (12) being rotation-symmetrical with reference to the rolling member axis (19), and being supported at the outer race track (8) and at the inner race track (7) so as to form four contact points (15, 16, 17, 18), the contact points (15, 16, 17, 18), with reference to a central plane (M) containing centers ($O_1$, $O_2$) of the inner race track (7) and the outer race track (8), being arranged so as to be offset at an angle ($\alpha$) which is greater than a self-inhibition angle.

2. A joint bearing according to claim 1, wherein the carrying portions (12) have an outer contour (13) corresponding to a circular arch having a radius ($R_W$) smaller than a radius ($R_L$) of either of the outer race track (8) and the inner race track (7), and a center ($O_3$) of the outer contour (13) is arranged on an imaginary ray starting from the center ($O_1$) of the outer race track (8) and inclined by the angle of inclination ($\alpha$) of the contact points (15, 16, 17, 18) relative to the central plane (M).

3. A joint bearing according to claim 2, wherein the radius ($R_W$) of the outer contour (13) of the carrying portions (12) of the rolling members (5) is dimensioned relative to the radius ($R_L$) of the outer race track (8) with an osculation factor (S) in accordance with the equation $$S = \frac{R_L}{2 \times R_W}$$

with S having a value between 0.51 and 0.75.

4. A joint bearing according to claim 1, wherein the angle of inclination ($\alpha$) by which the contact points (15, 16, 17, 18) are offset relative to the central (M) exceeds the self-inhibition angle at least by a maximum tilting angle ($\beta$).

5. A joint bearing according to claim 1, wherein the angle ($\alpha$) by which the contact points (15, 16, 17, 18) are inclined and offset relative to the central plane (M) amounts to at least 7° plus maximum tilting angle ($\beta$) starting from the central plane.

6. A joint bearing according to claim 1, wherein the rolling members (5) have an outer contour (13) ground to a finish-dimension by profiled forming discs.

* * * * *